United States Patent [19]

Rusnica, Jr. et al.

[11] Patent Number: 5,850,423
[45] Date of Patent: Dec. 15, 1998

[54] NUCLEAR RECTOR VESSEL WITH NOZZLE PLUG

[75] Inventors: Edward J. Rusnica, Jr., Irwin; Daniel E. Klinvex, McKeesport; Donald E. Skoczylas, Monroeville, all of Pa.

[73] Assignee: Westinghouse Electric Corporation, Pittsburgh, Pa.

[21] Appl. No.: 965,329

[22] Filed: Nov. 6, 1997

Related U.S. Application Data

[60] Provisional application No. 60/038,543 Feb. 28, 1997.
[51] Int. Cl.⁶ .................................................. G21C 13/06
[52] U.S. Cl. ............................................................ 376/204
[58] Field of Search .................................. 376/204, 286

[56] References Cited

U.S. PATENT DOCUMENTS

| | | | |
|---|---|---|---|
| 4,548,783 | 10/1985 | Dalke et al. | 376/204 |
| 4,584,162 | 4/1986 | Yoli | 376/204 |
| 4,591,477 | 5/1986 | Rettew | 376/204 |
| 4,769,207 | 9/1988 | Weber et al. | 376/204 |
| 4,834,935 | 5/1989 | Daigle et al. | 376/204 |

*Primary Examiner*—Daniel D. Wasil

[57] ABSTRACT

A nuclear reactor vessel has a nozzle plug in its cold leg and hot leg nozzles for isolating the reactor vessel from the balance of the reactor coolant loop. The nozzle plug is mechanically compression fitted with the nozzle without the need for hydraulic or pneumatic actuation. The plug has a primary seal ring compressed against the inner wall of the nozzle and a secondary seal ring compressed against the end wall of the nozzle for withstanding a pressure differential of about 34 feet of water.

6 Claims, 4 Drawing Sheets

NUCLEAR RECTOR VESSEL WITH NOZZLE PLUG

CROSS REFERENCE

This application claims the benefit of U.S. Provisional Application No. 60/038,543, filed Feb. 28, 1997.

BACKGROUND OF THE INVENTION

The invention relates to a nuclear reactor vessel having a nozzle plug in a vessel nozzle and more particularly to a vessel having a nozzle plug which may be inserted into a nozzle of a reactor vessel flooded with water without the need for pneumatic or hydraulic devices in order to isolate the reactor vessel from the balance of the reactor coolant loop.

Commercial pressurized water nuclear reactors are occasionally shutdown for refueling, inspection, maintenance or other off-line operations. In some cases, multiple off-line functions are performed simultaneously in order to return the reactor to on-line power operations as soon as possible. For example, it may be desired to off-load fuel in the core of a reactor vessel or inspect a reactor vessel while inspecting or servicing one or more main reactor coolant pumps. However, the reactor vessel may need to be flooded with water while the balance of the reactor coolant loop may need to be drained in order to service or inspect the pumps. Thus, plugs or dams are installed in the reactor or steam generator nozzles to isolate the reactor vessel from the balance of the reactor coolant loop. Typically, the installation of reactor vessel nozzle plugs in a flooded reactor vessel requires a substantial amount of time because either complicated tooling is employed or a diver is employed for manual installation.

SUMMARY OF THE INVENTION

It is an object of the present invention to provide a reactor vessel with a nozzle plug which may be more quickly installed in a hot leg or cold leg nozzle than can nozzle plugs now commercially employed by the industry. It is a further object to provide a nozzle plug which may be installed in a nozzle by mechanical means only without the need for hydraulic or pneumatic devices.

With these objects in view, the present invention resides in a nuclear reactor vessel having a horizontally disposed nozzle with a nozzle plug having a mechanically compressible seal ring for sealing the plug in the nozzle. In a preferred embodiment of the present invention wherein the vessel nozzle has an inner circumferential surface and a substantially perpendicular end surface, the nozzle plug has another mechanically compressible seal ring for sealing the plug against the end surface of the nozzle while the first seal ring seals the plug against the circumferential surface. In a preferred embodiment, the nozzle plug can be handled by conventional ten year in-service inspection tools as are other end effectors.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
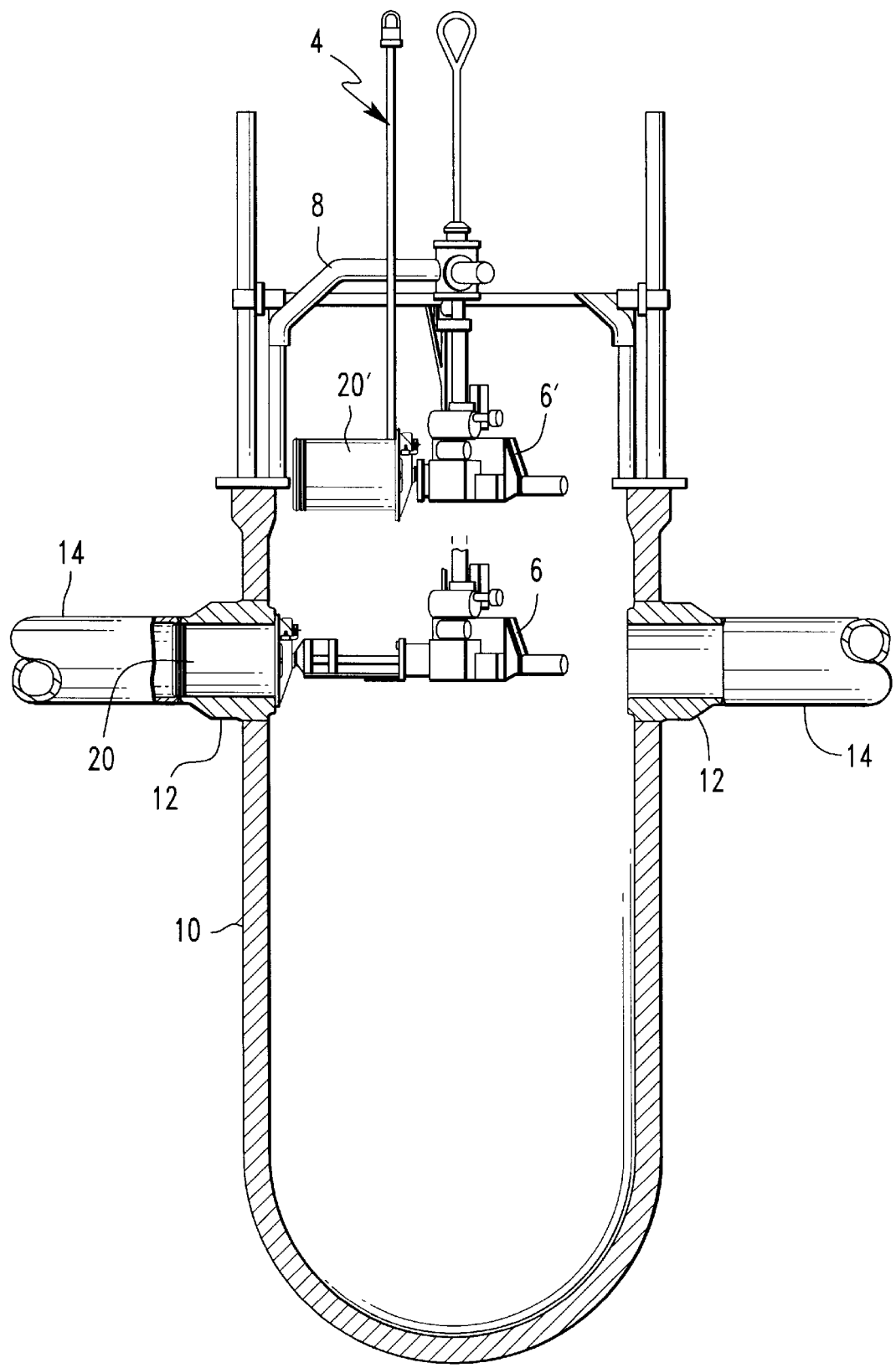
FIG. 1 is a schematic elevation view of a nuclear reactor vessel with its top head removed.

Referring now to the drawings in detail and in particular to FIG. 1, there is shown a remote docking tool 4 with a conventional in-service inspection tool 6 shown in two positions. An in-service inspection tool 6 is routinely employed to inspect vessel welds pursuant to US Nuclear Regulatory Commission requirements after ten years of operation. As is discussed in, e.g., U.S. Pat. Nos. 4,728,482 and 4,302,286, in-service inspections normally are conducted after the fuel and lower vessel internals are removed from a submerged reactor vessel 10. Thus, FIG. 1 shows the in-service tool 6 supported by a frame 8 standing on an uncovered nuclear reactor vessel 10 from which the internals and fuel have been previously removed. The reactor vessel has substantially horizontal nozzles 12, which are welded to pipes 14 such as the hot legs and cold legs of a reactor coolant loop of a pressurized water nuclear reactor. As is shown in FIG. 2, the nozzles 12 generally have an inner circumferential surface 16 and a substantially perpendicular end surface 18.

In order to permit the reactor coolant system pumps in the cold leg (not shown) to be serviced while the reactor is submerged under about 24 feet of water, pipes 14 (as well as the balance of reactor coolant loop) are drained. Therefore, nozzle plugs such as nozzle plugs 20 of the present invention are installed in the nozzles 12 to isolate the reactor vessel 10 from the balance of the reactor coolant loop. As shown in FIG. 1, a nozzle plug 20 is being installed in a nozzle 12 by the in-service inspection tool 6 in its installation position. Another nozzle plug 20' is being transferred from a docking tool 4 to the in-service inspection tool 6' in a docking position for ultimate installation in the other shown nozzle 12. In actual practice, there typically is only one operational in-service inspection tool in the reactor vessel 10. The nozzle plug 20 may be designed for hydrostatic heads of about 34 feet of water or more.

Figure 2:
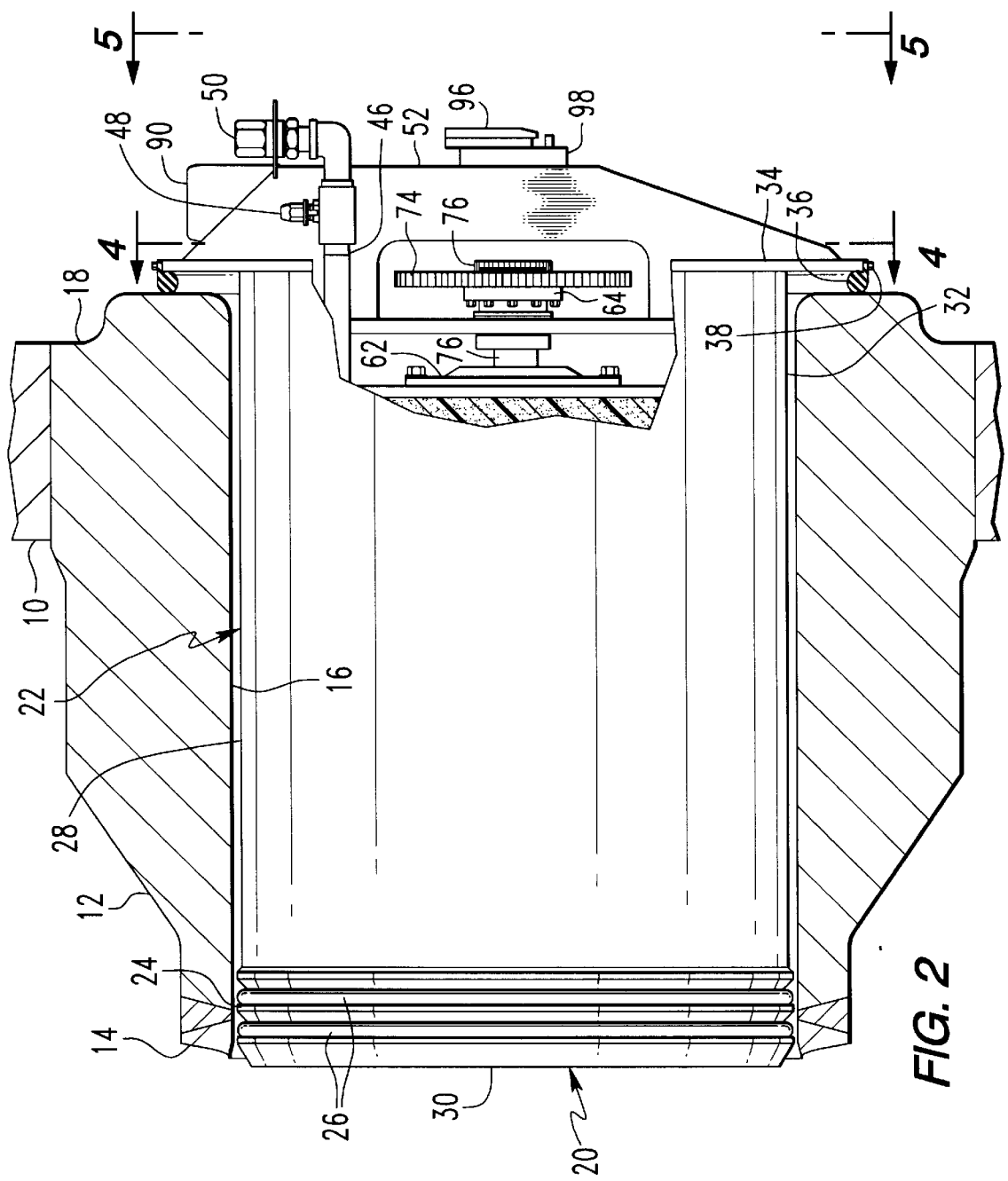
FIG. 2 is a schematic elevation view of a nuclear reactor vessel nozzle shown in FIG. 1 with a plug installed therein.
Figure 3:
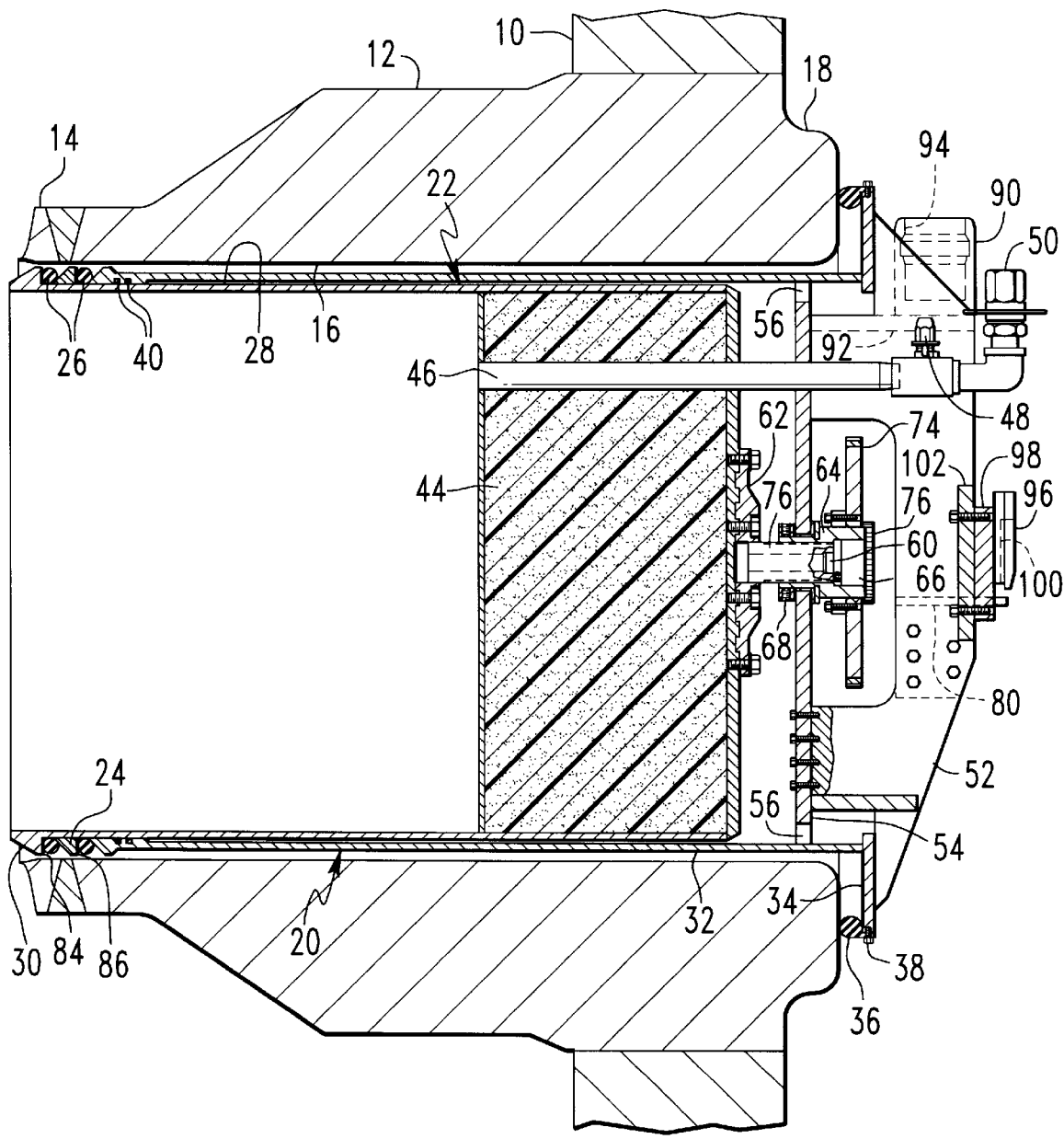
FIG. 3 is a schematic cross sectional view of the nozzle plug shown in FIG. 1.
Figure 4:
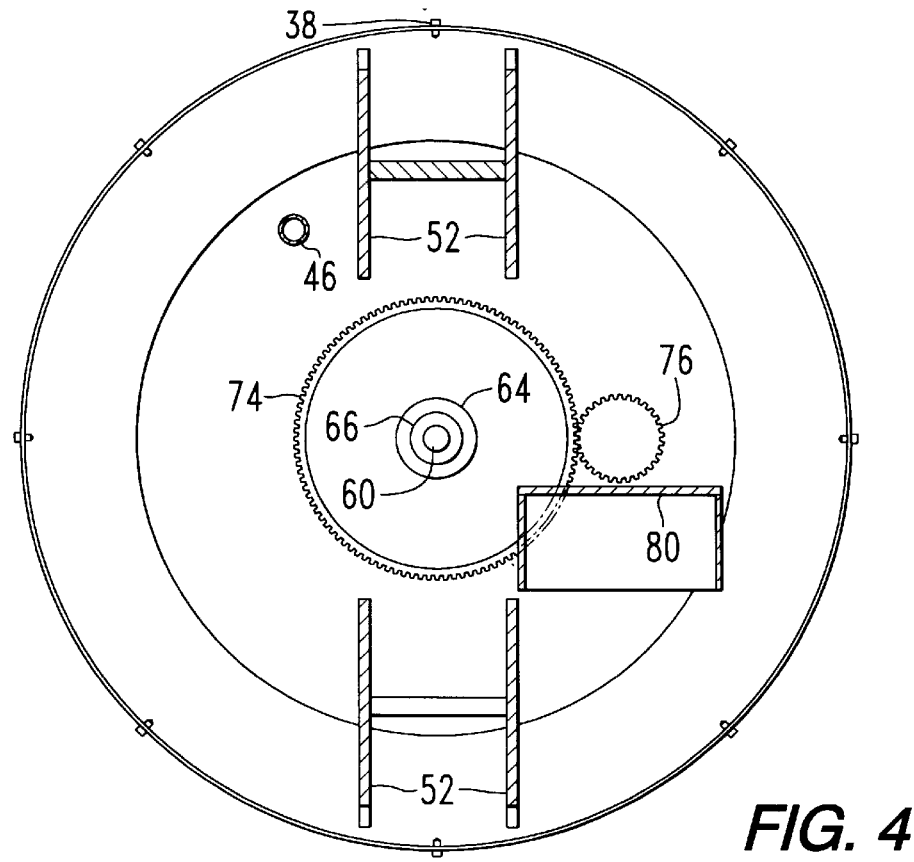
FIG. 4 is a sectional view of the nozzle plug taken along line 4—4 of FIGS. 2 and 3.
Figure 5:
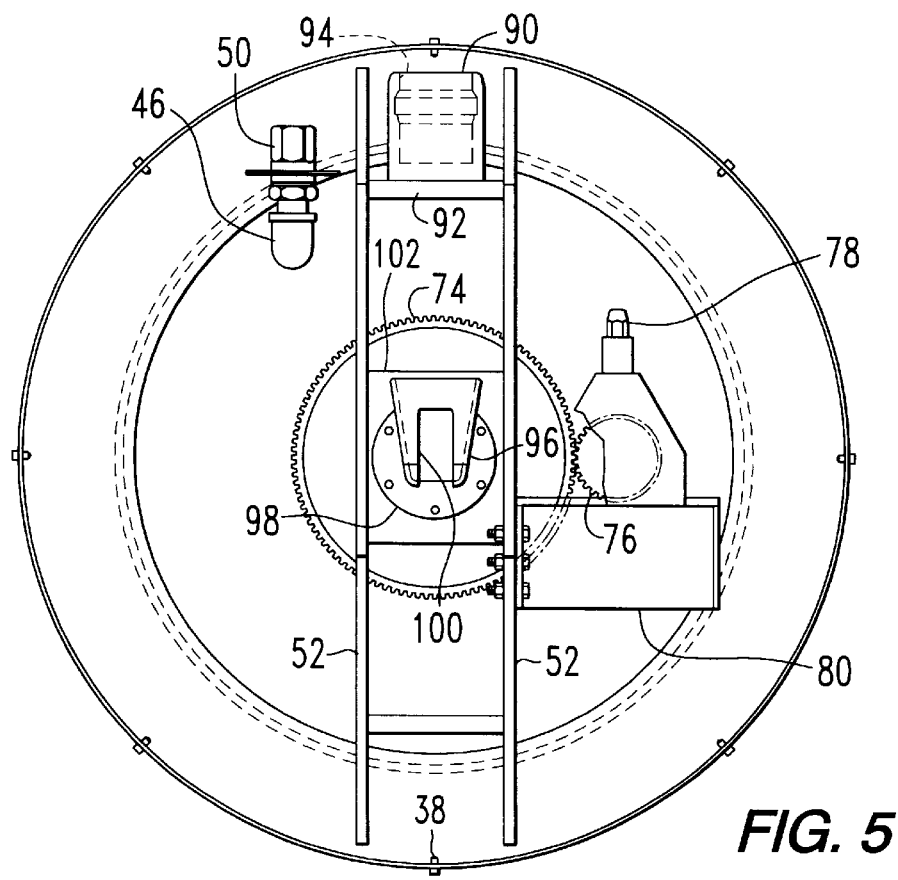
FIG. 5 is an end view of the nozzle plug taken along line 5—5 of FIGS. 2 and 3.

As shown in FIGS. 2 and 3, a nozzle plug 20 of the present invention generally includes a retainer 22, an expander ring 24 and two O-rings 26 on the peripheral surface 28 (shown in FIG. 3) of a plug body 30. The retainer 22 has a cylindrical body 32 with an end flange 34 is adjacent the inner end 18 of the nozzle 12. An O-ring 36 may be attached to the flange 34 by small bolts 38. The retainer 22, expander ring 24, and plug body 30 may be fabricated of any suitable material, however an aluminum alloy such as 6061-T6 is preferred to provide a relatively light weight, corrosion resistant material. The O-rings may be fabricated of an ethylene propylene dienne monomer or other suitable material which can be used at temperatures of about 40° F. to about 150° F. As shown in FIG. 2, the O-rings 26 are compressed against the circumferential surface 16 of the nozzle 12 to form a primary seal and the O-ring 36 is compressed against the end surface 18 of the nozzle 12 to form a secondary seal. As shown in FIG. 3, the O-rings 26 are not compressed. In addition, small O-rings 40 form a seal between the retainer 22 and the plug body 30.

The nozzle plug 20 may have a diameter on the order of up to about three feet or more at flange 34, a length of about four feet or more and weigh up to about 500 pounds or more. Thus, plug body 30 preferably has a rigid polyurethane foam 44 or other suitably light weight material for adjusting the buoyancy of the nozzle plug 20 in water. Most preferably, the nozzle plug 20 has about neutral buoyancy in room temperature water so that the nozzle plug 20 will not tend to float off the docking tool 4 or the in-service inspection tool 6. Also, the nozzle plug 20 would not tend to rise to the top of the pool in which the vessel 10 is submerged if it were dislodged from a nozzle 12. If desired, however, the plug 20 could be designed to float. The plug bodies 30 may be hard anodized in order to facilitate decontamination. A tube 46 extends through the plug body 20 to a ball valve 48 or other suitable shutoff device and a hose connection 50 for venting the pipes 14 when the balance of the coolant loop is drained after the plug 20 is installed. As shown for purposes of illustration, the shutoff valve 48 and hose connection 50 are disposed beyond strongback supports 52, which are bolted or otherwise attached to the retainer flange 34 and retainer cross plate 54. Preferably, however, the valve 48 and hose connection 50 are positioned closer to the retainer flange 34. As is shown in FIG. 3, the retainer plate 54 has one or more apertures 56, which permit water to be displaced as the plug 20 is installed or removed.

A threaded stud 60 extends from a mounting plate 62 bolted or otherwise suitably attached to the plug body 20 for engaging a nut 64, which is rotatably mounted by a collar 66 and set screw 68 (shown in FIG. 3) on the retainer cross plate 54 extending across the retainer cylinder 32. The nut 64 is bolted or otherwise suitably attached to a large gear 74 which is driven by a drive train 76 actuated by an actuator nut 78, which can be turned by a remote tool (not shown). As is shown, the drive train 76 and actuator nut 78 may be supported on a plate 80 bolted or otherwise attached to one of two strongback supports 52.

Rotation of the nut 64 mounted on the retainer 20 by the drive train 76 will cause the threaded stud 60 and the nozzle plug 30 to translate a distance of up to about one and a quarter inches or to compress (or release) the two O-rings 26 shown as compressed in FIG. 1 and released in FIG. 2. Advantageously, the tube 46 extending through the plug body 30 and the cross plate 54 tends to prevent rotation of the plug body 30 as it translates. As is shown in FIG. 2, the plug body 30 preferably has a surface 84 which extends substantially perpendicularly from its cylindrical portion 28, and the retainer ring 24 preferably has a similarly substantially perpendicular surface 86. These substantially perpendicular surfaces 84 and 86 advantageously prevent a static head of water from forcing the O-rings 26 out of the plug 20.

The retainer 20 has a docking tool connector 90 which may be supported on a plate 92 bolted or otherwise attached to the strongbacks 52. The docking tool connector 90 has a bore 94 configured to releasably receive the end of the remotely operated docking tool 4 (shown in FIG. 1). In addition, the retainer 30 also has an in-service inspection tool connector 96 which may be supported on a plate 98 bolted or otherwise attached to another plate 102 welded or otherwise attached to strongbacks 52. The in-service inspection tool connector 94 has an aperature 100 configured to releasably receive the in-service tool 6 (shown in FIG. 1).

To plug a nozzle 12 of the reactor vessel 10 from a hot leg or cold leg 14 after the head of the vessel 10 has been removed in the course of a routine ten year in-service inspection (as is shown in FIG. 1), a conventional docking tool 4 carrying a nozzle plug 20 via its docking tool connector 90 transfers the plug 20 to an in-service inspection tool 6 supported on the reactor vessel 10 in its docking position. The in-service inspection tool 6 receives the nozzle plug 20 via its in-service inspection tool connector 96 and handles the nozzle plug 20 like other end effectors. The in-service inspection tool 6 then positions the nozzle plug 20 in a nozzle 12 and presses the retainer plate 34 toward the end 18 of the nozzle 12 to compress the secondary O-ring 36 with a preload of up to about 400 psi or more. While the nozzle plug 20 is maintained in position by the in-service inspection tool 6, a long handled tool (not shown) turns actuator nut 78 to move the stud 60 and plug body 30 up to about one and one quarter inches or more to compress the O-rings 26 against the circumferential walls 16 of the nozzle 12. The pressure exerted by O-rings 26 on the circumferential wall 18 preferably is greater than the pressure exerted by O-ring 36 on the end 18 so that the nozzle plug can not become dislodged when the in-service inspection tool is detached from the connector 96. If the balance of the reactor coolant loop is to be drained, hoses (not shown) may then be connected to tube connections 14, valves 48 opened (if not already open) to vent the loop and the water drained through one or more drain lines in the loop (not shown). After draining, the valves 48 may be closed and the hoses removed. The O-rings 26 may deform up to about one half inch or more and exert up to about 150 psi on the nozzle 12. The nozzle plugs 20 may be removed by reversing these steps.

While a present preferred embodiment of the present invention has been shown and described, it is to be understood that the invention may be otherwise variously embodied within the scope of the following claims of invention.

What is claimed is:

1. A nuclear reactor vessel having: a horizontally disposed nozzle, the nozzle having an inner circumferential wall and an end wall substantially perpendicular thereto, and a nozzle plug in the nozzle, the plug having a first mechanically compressible seal ring for sealing the plug against the circumferential wall in the nozzle and a second mechanically compressible seal ring for sealing the plug against the end wall while the first mechanically compressible seal ring is sealed against the circumferential wall.

2. The nuclear reactor vessel of claim 1, wherein the nozzle plug comprises:
   a cylindrical retainer positioned in the nozzle, the retainer having a cross member;
   a nut rotatably mounted on the cross member;
   a plug body disposed in the cylindrical retainer, the plug body having a peripheral surface and a surface extending substantially perpendicularly from the peripheral surface; and
   a stud mounted on the plug body and threadably engaged with the rotatably mounted nut; and wherein
   the seal ring is disposed on the peripheral surface of the plug body between the perpendicularly extending surface of the plug body and the cylindrical retainer.

3. The reactor vessel of claim 2, wherein the nozzle plug has a vent extending through the plug body and the cross member.

4. The reactor vessel of claim 2, further comprising a gear drive assembly connected with the rotatably mounted nut.

5. The reactor vessel of claim 1, having an in-service inspection tool connection.

6. The reactor vessel of claim 1, having substantially neutral buoyancy in water.

* * * * *